Figure 1:
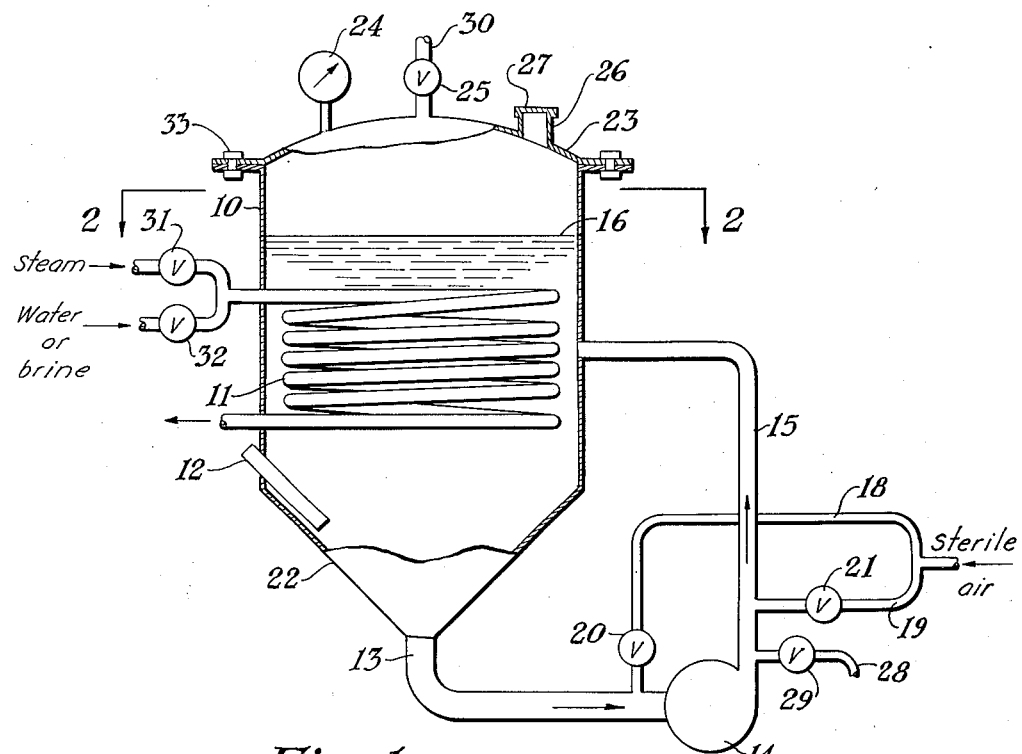

June 24, 1947.   G. M. EISENBERG ET AL   2,422,777
METHOD FOR PRODUCING PENICILLIN BY MOLD CULTURE
Filed Dec. 6, 1944

INVENTORS
George M. Eisenberg
BY Joseph L. Metzendorf

Dean Laurence
ATTORNEY

Patented June 24, 1947

2,422,777

UNITED STATES PATENT OFFICE 2,422,777

METHOD FOR PRODUCING PENICILLIN BY MOLD CULTURE

George M. Eisenberg, Philadelphia, and Joseph L. Metzendorf, Jenkintown, Pa., assignors to J. T. Baker Chemical Company, Phillipsburg, N. J., a corporation of New Jersey Application December 6, 1944, Serial No. 566,896

8 Claims. (Cl. 195—36)

1

This invention relates to a method for culturing aerobic fungi of the genus Penicillium and particularly to a method whereby high concentrations of penicillin are produced in the culture mixture.

The production of penicillin on a commercial scale has been described briefly in the literature. Of the several types of processes suggested, that usually referred to as the "submerged or deep-tank fermentation process" is probably regarded as the most practical at this time. In this process the mixture of culture medium and growing organism is stirred and aerated during the incubation period so that the organism is caused to grow substantially below the liquid surface and throughout the mass of the culture medium.

In comparison with other processes, as for example the "surface fermentation process" wherein the Penicillium is grown in accordance with its natural habit on the surface of the culture medium either in liquid or solid media contained in flasks, bottles or trays, or the "bran process" wherein the Penicillium is propagated on bran wetted with a suitable nutrient solution contained in large drums, the submerged process offers important advantages. A very significant advantage of the "submerged process" over the "surface fermentation process" is the operating advantages gained in handling the culture medium containing the growing organism as a bulk liquid in large vessels rather than in a large number of small containers. The "bran process" while capable of handling larger quantities of growing organism than the surface methods referred to above, suffers from the disadvantages of poor temperature control throughout the bran mass and the necessity of introducing a liquid mass such as water to recover the penicillin. There are other methods for producing penicillin such as the use of various solid media and the "trickling filter" method but none of them, for one reason or another, produce penicillin as economically as the above-described methods.

One of the most serious disadvantages of all known processes for the production of penicillin is the length of time required for the organism to develop a maximum concentration of penicillin in the medium. The amount of penicillin which can be produced in any particular equipment is, of course, dependent upon the actual concentration of penicillin developed in the medium and the time required. The actual yield and purity of product in usable form which it is possible to obtain is also dependent in large measure on the concentration thereof produced in

2 the medium. When a medium has a very low concentration of penicillin the losses during recovery and the impurities in the final product will be greater than when the medium has a very high concentration of penicillin.

In addition, the submerged fermentation processes as heretofore carried out have presented certain difficulties. Thus, while it is known that penicillin production by the submerged fermentation process is favored by aeration and agitation, attempts to gain the maximum benefits from increased aeration and agitation, through the use of conventional apparatus have been largely unsuccessful due to the changing consistency of the fermentation mixture during the growth period from a thin fluid state to a thick viscous mass. By conventional apparatus for submerged fermentation we mean propeller or paddle type agitators and spargers or other air diffusers operating submerged in the medium which is contained in a stationary tank. In some instances the process has been carried out in a rotating tumbler containing baffles or other devices to lift and stir the mass as the tumbler rotates, air being passed through the tumbler while it rotates. Regardless of the specific apparatus employed little advantage has heretofore accrued to further attempts to aerate or stir the mass more efficiently and it has been assumed that little was to be gained by any further efforts in this direction.

It is an object of the present invention to provide a method for the culturing of penicillin-producing aerobic fungi of the genus Penicillium. An additional object is to provide a method for the culturing of penicillin-producing fungi whereby a high concentration of penicillin is produced in the medium during the growth of the fungus. Still another object is to provide a process for the production of penicillin characterized by the rapid formation of a high concentration of penicillin in the medium.

We have found that the conditions favorable for a rapid development of the Penicillium fungus and the production of a high concentration of penicillin in the culture medium are obtained when intimate contact between the fungal hyphae and the culture liquid is continuously maintained; when the culture medium is continuously agitated in contact with sterile air so that it may contain a sufficient amount of dissolved oxygen at all times during the fermentation process and so that at the same time the air may act to blow out any gases or other volatile products of metabolism detrimental to the growth of the Penicillium or production of penicillin; and when the fungal mycelium is so maintained in suspension during the fermentation process that there is no deposition of fungus on the bottom of the fermentation tank.

We have further found, that when a submerged fermentation type process for the production of penicillin is carried out in such manner that the above conditions are satisfied the time necessary for the penicillin content of the mass to reach a maximum is reduced markedly and, furthermore, that the maximum concentration of penicillin developed in the mass is considerably higher with a given organism and culture medium than is obtainable in conventional procedures. Due to the difficulty of agitating the entire mass sufficiently vigorously to disperse therein the sterile air in sufficiently finely divided form, the process is carried out by continuously withdrawing a portion of the mass from the fermentation vessel, agitating the withdrawn portion vigorously while passing air into it and returning the gas-liquid suspension to the main body of the fermenting mass.

A series of parallel tests were run using three tanks: one stationary tank with propeller agitator, one revolving tank, both of conventional design as described above, and a third tank of novel design and our own invention, described later. On the average, the two conventional tanks required six to seven days to achieve maximum penicillin concentration whereas the novel tank required thirty-six to sixty hours. Furthermore the average maximum titre in the conventional tanks was forty to fifty Oxford units of penicillin per milliliter whereas the novel tank produced titres of ninety-five to one hundred fifteen Oxford units per milliliter. It is apparent that the amount of penicillin which may be produced from a unit amount of raw material in a given time, as well as in apparatus of a given capacity, is increased when using the process of the invention. Thus, the overall amount of penicillin produced when using the process of the invention may be from two to three times or more than that obtainable from the same amount of raw materials, and using equipment of same size, as when carrying out the process in the previously described manner.

Although the high degree of agitation and of aeration of the medium containing the growing organism which characterizes the process of the invention may be accomplished in any convenient manner, certain considerations, such as the necessity of maintaining rigid control of the temperature and of other environmental conditions, as well as the exclusion of all micro-organisms other than the Penicillium mold from the entire system indicates certain types of equipment to be preferable for use in carrying out the process. It is, however, understood that the invention is not limited in any way as to equipment, that described herein constituting but one type of apparatus in which the process may be carried out conveniently.

Figure 2:
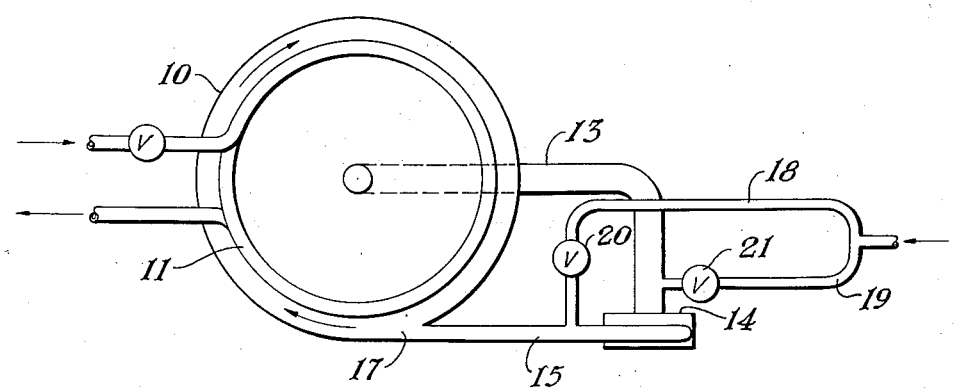

Reference is made to the accompanying drawing in which, in the interest of clarity, certain features are shown on a somewhat exaggerated scale and wherein:

Fig. 1 is a diagrammatic side elevation of an apparatus useful in carrying out the preparation of a fermented broth rich in penicillin, and Fig. 2 is a diagrammatic view along the line 2—2 of Fig. 1.

Referring to Fig. 1, a fermenter tank 10, fitted with an internal coil 11 through which steam, or water, or brine, may be passed for temperature control and a thermometer well 12, is arranged to drain by gravity through pipe 13 to a centrifugal pump 14. The stream from the pump 14 passes through a pipe 15 back into the fermenter tank 10 below the level 16 of the fluid mixture contained therein. The return from the pump is preferably introduced tangentially, as at 17 of Fig. 2, into the fermenter tank so as to impart to the liquid therein a swirling motion thus eliminating the need of a mechanical agitator in the tank 10. A series of pipes 18 and 19 valves 20 and 21, connected with a source of sterile air, is arranged to permit the controlled introduction of sterile air into the stream of circulating fluid. Such sterile air may be introduced into the stream either before or following its passage through the pump. In either case, the air is finely divided and distributed throughout the mass of the flowing liquid by the action of the pump. Due to the introduction of the return fluid from the pump into the tank 10 tangentially to the fluid therein a violent swirling motion is set up which lessens the rate at which the minute air bubbles dispersed throughout the mass rise to the surface and escape. The tank 10 is provided with a conical bottom to facilitate even drainage and with a tight cover 23, fastened as with bolts 33, to withstand a moderate internal pressure. The cover is fitted with a pressure gauge 24, a vent 30, a vent valve 25, and a loading port 26 covered with a tightly fitting cap 27. A sample port 28 and valve 29 may, if desired, be installed at any convenient point in the system through which a sample may be withdrawn from time to time to determine the condition of the contents of the fermentation vessel. Air, introduced through the pipe 18 or 19, eventually rises to the surface of the liquid in the tank 10 and escapes through the vent 30, the vent valve 25 being adjusted so as to maintain at all times a positive pressure on the system and thus to reduce the possibility of drawing contaminating organisms into the system. Welded stainless steel construction has been used with entire satisfaction, but is not required.

The production of sterile air, e. g. by washing with water, filtering through a Seitz filter, and irradiating with ultraviolet light, is well known in the art and need not be discussed here.

In a specific instance a fermentation tank similar to that described above and having a capacity of about 160 liters was loaded through the loading port 26 with 100 liters of an aqueous mixture containing in each liter

| | | |
|---|---|---|
| $MgSO_4.7H_2O$ | grams | 0.25 |
| $KH_2PO_4$ | do | 0.50 |
| $NaNO_3$ | do | 3.0 |
| $ZnSO_4 7H_2O$ | do | 0.044 |
| Lactose | do | 40.0 |
| Corn steep liquor (penicillin grade) | milliliters | 80.0 |

The loading port was then closed, the circulating pump started and the vent valve 25 opened. Liquid circulated through the pump at a rate of about 66 liters per minute. Steam under pressure was then admitted to the coil 11. When the liquid in the tank 10 was boiling and the generated steam had swept substantially all of the air above the liquid out through the vent 30, the vent valve 25 was closed almost shut and the pressure in the tank 10 kept at about 15 pounds per square inch for about 45 minutes by adjusting the steam valve 31. The steam valve 31 was then closed and water valve 32 opened allowing cooling water to flow through the coil 11 in the tank. When the pressure in the tank had fallen to about two to five pounds per square inch, sterile air was admitted through the previously sterilized pipe 19 and valve 21. The vent valve 25 was opened slightly so that with about one cubic foot per minute of air entering the system through the valve 21 the pressure in the tank 10 maintained at about five pounds per square inch until the temperature of the liquid had fallen to about 26° centigrade. The flow of water through the coil 11 was then stopped. The air valve 21 was almost closed so that there was only a slight positive pressure on the system and the cap 27 on the loading port 26 was removed and there was added quickly 95 milliliters of a previously sterilized sulfonated vegetable oil as a defoaming agent, 570 grams of previously sterilized calcium carbonate and a five to eight day old spore culture of *Penicillium notatum*. All pouring surfaces were flamed carefully before, during, and after the addition of these ingredients and the cap quickly replaced and tightened. The flow of air was then readjusted to about one cubic foot per minute and the vent valve 25 adjusted to keep the pressure in the tank at five to twelve pounds per square inch. Incubation at 25° to 27° centigrade was continued for forty-eight hours, samples being withdrawn from time to time through the sampling tube 28 and examined.

At the beginning of the incubation period the pH of the mixture was between 4.8 and 5.3. At the end of six to eight hours, there was no appreciable change in the pH of the mixture and germination of the spores had begun. At the end of 18–24 hours, the pH had risen to from 6.5 to 6.9, the viscosity of the mixture had increased slightly, germination of the spores was substantially complete, the fungal hyphae had begun to branch, and septae had formed. The growth had progressed so that there was little free liquor in evidence and penicillin was present in the mass. From the end of the 24 hour period to completion of the incubation period there was a gradual increase in viscosity and of penicillin content of the mass and some sporulation of the organism was apparent. At the end of 48 hours, the mass had the consistency of a light batter, was slightly brownish in color and had an odor associated with aromatic amines. The pH was about 7.4 and very little pigmentation had developed. Additional defoamer was added from time to time as needed throughout the period. A sample of the fluid obtained by filtering the mass in the tank contained 100 Oxford units of penicillin per milliliter. About 60–70 percent of the penicillin in the filtrate was recoverable in usable form by conventional procedures with the final product having a purity of about 630 Oxford units per milligram.

Although satisfactory results have been obtained when operating in the above fashion, considerable latitude is permissible in certain respects without sacrificing the advantages of the invention. Among the organisms which may be thus cultured to produce a high yield of penicillin may be mentioned *Penicillium notatum*, and *Penicillium chrysogenum*. Although it is essential that the air passed through the system be broken up into fine bubbles and contacted intimately with all parts of the fluid, the amount of air may be varied over a considerable range. Using the 100 liter charge referred to in the preceding example the volume of air has been varied over the range of from less than 0.6 to more than 2.0 cubic feet per minute (measured under atmospheric pressure) with entire satisfaction. The pressure at which the air in the fermenter tank is maintained does not seem to be critical, although it is desirable to maintain the entire system under at least a slight positive pressure to avoid the entrance of contaminating organisms through pin holes in the welds, through stuffing boxes, or otherwise. The temperature at which the process is carried out is that temperature favoring the formation of the greatest concentration of penicillin in the shortest time, although some variation from this temperature may be practiced if desired. The optimum temperature may not be the same for each of the penicillin-producing organisms, and may also vary somewhat with the nature of the medium used. Although inoculation of the medium with Penicillium spores is preferred, inoculation may be pregerminated cultures if desired. In the latter case, a somewhat longer time for the penicillin content to reach a maximum may be required.

It is well known in the art that the amount of penicillin concentration obtainable with a given medium and a given submerged fermentation method depends not only on the strain of mold used, but also on the condition of the mold at the time of inoculation. In a few generations a mold culture may lose most of its ability to produce penicillin. Because of this extreme variability in the penicillin producing organisms, it is felt that only parallel tests with other fermentation methods using portions of the very same inoculum in the different units would serve to reveal the relative value of the fermentation methods with regard to ability to produce a high titre. The values of 95 to 115 Oxford units per milliliter quoted above are those obtained during a series of parallel test runs. Actually, the inventors have made many other runs with different penicillin producing organisms and with different media but which were not run on a parallel basis. Many of these runs produced substantially higher titres than those given above.

We claim:

1. The method for culturing a penicillin-producing mold which includes: inoculating a liquid culture medium with a penicillin-producing mold; continuously withdrawing a portion of the inoculated medium from the main body of the liquid; continuously dispersing air substantially uniformly and in finely divided form throughout the withdrawn portion; and returning the medium containing the finely dispersed air to the main body of the liquid below the surface of the liquid while maintaining violent agitation of the main body of the liquid.

2. The method for culturing a penicillin-producing mold which includes: inoculating a liquid culture medium with a penicillin-producing mold; continuously withdrawing a portion of the inoculated medium from the culture vessel; continuously dispersing air substantially uniformly and in finely divided form throughout the withdrawn portion; and returning the medium containing the finely dispersed air to the culture vessel below the surface of the liquid therein while maintaining violent agitation of the culture medium in the vessel.

3. The method for producing penicillin which includes: inoculating a liquid culture medium with a penicillin-producing mold; continuously withdrawing a portion of the inoculated medium from the culture vessel; continuously dispersing air substantially uniformly and in finely divided form throughout the withdrawn portion; returning the medium containing the finely dispersed air to the culture vessel below the surface of the liquid therein while maintaining violent agitation of the culture medium in the vessel; and recovering penicillin from the mixture.

4. The method for culturing a penicillin-producing mold which includes: inoculating a liquid culture medium with a penicillin-producing mold; continuously withdrawing a portion of the inoculated medium from the culture vessel; continuously dispersing air substantially uniformly and in finely divided form throughout the withdrawn portion; and returning the medium containing the finely dispersed air to the culture vessel below the surface of and tangentially to the body of the liquid therein to impart thereto a violent swirling agitation and thereby to delay the escape of the dispersed air from the body of the liquid.

5. The method as claimed in claim 2 wherein the penicillin-producing mold is *Penicillium notatum*.

6. The method as claimed in claim 2 wherein the penicillin-producing mold is *Penicillium chrysogenum*.

7. The method as claimed in claim 2 wherein the medium is inoculated with a five to eight day old spore culture of a penicillin-producing mold.

8. The method as claimed in claim 2 wherein incubation is continued for from forty-eight to sixty hours.

GEORGE M. EISENBERG.
JOSEPH L. METZENDORF.

REFERENCES CITED

The following references are of record in the file of this patent:

UNITED STATES PATENTS

| Number | Name | Date |
| --- | --- | --- |
| 313,432 | Kuhn | Mar. 3, 1885 |
| 930,274 | Doughty | Aug. 3, 1909 |
| 2,056,576 | Jansen | Oct. 6, 1936 |
| 2,298,561 | Hendrickson | Oct. 13, 1942 |